June 25, 1940.                C. PFANSTIEHL                2,205,931
                           STRAIGHT LINE WELDING
                            Filed Sept. 2, 1938
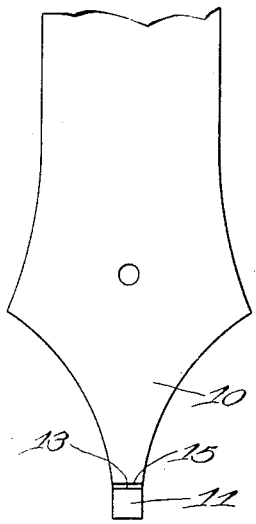
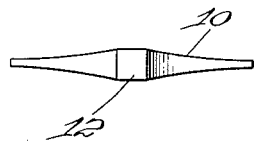
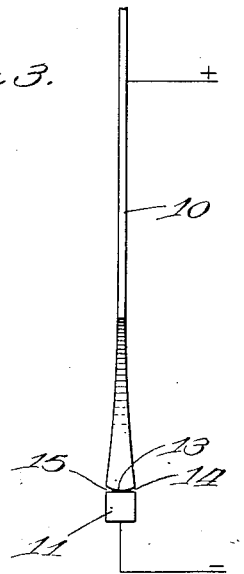
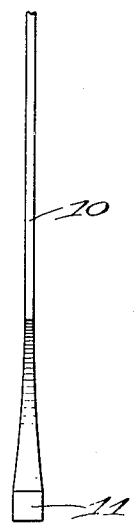
Inventor:
Earl Pfanstiehl.
By Chritton, Wiles, Davis, Hirsch & Dawson
Attys.

Patented June 25, 1940

2,205,931

UNITED STATES PATENT OFFICE 2,205,931

STRAIGHT LINE WELDING

Carl Pfanstiehl, Highland Park, Ill., assignor to Pfanstiehl Chemical Company, a corporation of Illinois Application September 2, 1938, Serial No. 228,223

2 Claims. (Cl. 219—10)

This invention relates to a method of welding small tips to bases, and the product thereof, and particularly to a method of welding small tips, such as those for pen nibs, to bases without any noticeable flowage of molten metal and without the production of any molten metal which extends beyond the margin of the weld.

The ordinary principles of butt welding are not applicable to small articles, such as pen points, meter pivots and phonograph needles, and it has therefore been necessary to bring tip and nib into lightly pressed contact during the weld. This type of welding therefore did not necessarily produce the bulge or bead which is characteristic of butt welding. On the other hand, as shown, for example, in my co-pending application Serial No. 126,712, filed February 19, 1937, now Patent No. 2,145,274, issued January 31, 1939, and my Patent No. 2,032,887, issued March 3, 1936, it was customary to melt a considerable portion of nib metal which ran down around the tip and, in fact, it was customary, as shown in Patent 2,032,887, to judge the time for termination of the welding operation by the falling of the base a predetermined distance, the falling being caused by melting of nib metal. Inasmuch as a large portion of the metal which runs down must be ground away, both tip and nib had to be larger in the former practice. It was always thought necessary heretofore that the tip be at least partially surrounded by nib metal in order to obtain a proper weld. I have now discovered, however, that if the pen tip and the pen nib are both provided with a substantially flat surface adjacent the weld, so that on completion of the weld there will be substantially a single plane of welding, that a very satisfactory weld may be obtained without the production of any surrounding nib metal or even of a bulge or bead.

This is accomplished preferably by slightly rounding at least one of the otherwise flat adjacent surfaces of tip and base. The rounding is so slight as to be perceptible only under very careful inspection, and is just enough to provide a line contact at the initiation of welding.

If the rounding is carried out by a grinding or punch press operation, the nib is preferably rounded because it is larger, softer, and therefore easier to operate upon. However, it is possible to preform the tip with a slightly rounded surface.

In carrying out the welding, just enough metal is melted from the nib at the apex of the rounded portion to fill the voids between the two.

In carrying out the welding according to this method, it is highly advantageous to have the area of the top of the tip and the area of the bottom of the nib identical, inasmuch as this greatly cuts down the amount of grinding required in the finishing operations. Moreover, inasmuch as no base metal surrounds the tip metal, or even touches it except upon the upper surface, a superior and more uniform pen is produced after grinding.

The invention is illustrated in the drawing in which:

Figure 1 is a front view of a pen nib in lightly pressed contact upon a substantially cubical pen tip; Figure 2 is an end view of the pen nib; Figure 3 is a side view corresponding to Figure 1, but indicating diagrammatically electrical connections; and Figure 4 is a side view of a completely welded pen point before any grinding or splitting.

As shown in Figure 1, a pen nib 10 is brought into lightly pressed contact with a tip 11. This contact may be produced and maintained in any manner, for example, as shown in my application Ser. No. 126,712. As shown in Figure 2, the bottom face 12 of the nib is squared, but, as shown in Figure 3, is provided with a slight roll 13, (exaggerated in the drawing for clarity) leaving voids 14 and 15 at the sides.

As shown in Figure 4, after the welding operation is complete, the voids 14 and 15 have been filled, the pen nib having dropped a distance equal to approximately one-half of the height of the roll 13.

It has been found that with this form of device, no cut-off means are required because the area of contact is so enormously increased upon melting of the nib metal, which is usually gold, that the current no longer heats the metal to melting temperature. For example, using a welding transformer with considerable self regulation so as to prevent the current from increasing to an excessive value upon fusion of metal and with an initial voltage of about 2 to 3, with a square tip approximately 0.030 by 0.025", and a current of about 125 to 200 amperes, very satisfactory welding was obtained.

It is preferred not to melt any of the tip metal. Inasmuch as it usually is a very high melting point "iridium" alloy, and generally is one containing a large proportion of osmium, there is little tendency of it to melt under the circumstances.

In view of the wide variance in melting point between tip and base, the use of a flux is highly desirable, and it may be applied to the base in any suitable manner; for example, as disclosed in the co-pending application of Bruce Chandler, Serial No. 224,640, filed August 12, 1938, (now Patent No. 2,167,925, issued Aug. 1, 1939).

Pens produced by the present process are of improved appearance and uniformity. There is also a considerable saving in base or nib metal, the nib blanks actually being made at least 1/32" shorter when following the present method. This not only saves gold, but improves the flexibility of the pens.

The foregoing detailed description has been given for clearness of understanding only, and no unnecessary limitations should be understood therefrom, but the appended claims should be construed as broadly as permissible in view of the prior art.

I claim:

1. The method of attaching a small, relatively high melting point metallic tip to a base which comprises bringing tip and base into lightly pressed contact, the cross sectional areas of the tip and base at the contacting surface being substantially identical, and each welding surface being substantially flat, but at least one being provided with an almost imperceptible curvature whereby a line contact is formed centrally of the surfaces leaving a small void increasing in depth toward the edges of the abutting surfaces, passing an electric welding current through the tip and base to melt just enough base metal to fill the voids and produce a substantially plane contact without melting any of the tip and without forming any extrusion beyond the initial cross sectional areas of the tip and base, the contacting surfaces so enormously increasing in area upon melting of the base metal that the current density is greatly reduced and metal is no longer heated to melting temperature.

2. The method as set forth in claim 1 in which the welding surface of the base only is curved.

CARL PFANSTIEHL.